March 7, 1967 H. P. GRACE ET AL 3,307,332
ELECTROSTATIC GAS FILTER
Filed Dec. 11, 1964 4 Sheets-Sheet 1

INVENTORS
HAROLD PAGET GRACE
FREDERICK FLAKE WHITE, JR.
BY *Harry C. Braddock*
ATTORNEY

INVENTORS
HAROLD PAGET GRACE
FREDERICK FLAKE WHITE, JR.

BY *Harry C. Braddock*
ATTORNEY

FIG. 6

3,307,332
ELECTROSTATIC GAS FILTER
Harold Paget Grace, Havertown, Pa., and Frederick Flake White, Jr., Wilmington, Del., assignors to E. I. du Pont de Nemours and Company, Wilmington, Del., a corporation of Delaware
Filed Dec. 11, 1964, Ser. No. 417,742
24 Claims. (Cl. 55—103)

This invention relates generally to the field of separating suspended small particles from gases. More specifically the invention involves an improved high efficiency gas filtering combination for separating charged and uncharged fine particles preferably in the size range above about 0.2 micron in diameter from gas streams containing them; which combination utilizes a novel arrangement of an interengaged mass of special fibers, strands, or filamentary elements, having a particular electrostatic charge condition maintained therein.

The improved filter devices embodying the present invention are of particular value in the fields of air conditioning, heating, and ventilating systems.

Gas filter devices generally comprising electrically charged masses of fibers or strands are known in the prior art. Some of these filter devices such as are disclosed in U.S. Patents 2,597,927, and 2,612,9966 utilize masses of filaments which masses develop net electrostatic charges thereon when a gas stream is passed over the filaments. Other filter devices such as disclosed in U.S. Patent 2,573,964 utilize felts made of felted natural fibers which are coated with electrified particles of resinous material. In each of these prior art devices, it appears that a net charge of one polarity or the other is developed on the mass of filaments or particles as a whole. Such a charge has been found to improve separation of particles from gas streams to a limited extent.

Yet other prior art such as U.S. Patent 2,740,184 discloses sheets or fabrics of threads or filaments which have been permanently polarized electrostatically. It appears that the filaments or sheets of this type device possess positive and negative charges which result in zero net charge on the filaments or sheets.

It has been observed that these prior art filter devices possess certain disadvantages and deficiencies. For example, in the filter devices in which the overall mass of filaments is given a high net charge of a given polarity, the high net charge of the filter mass attracts ions of the opposite polarity from the atmosphere in surrounding space whether the filter is in operation or not. Since contact of these ions with oppositely charged areas of the filaments neutralizes a portion of the charge on such areas, this accelerates discharge or neutralization of the net charge of the filter, which reduces filtering efficiency and shortens useful filter life. In addition, with respect to charged particles in the gas stream being filtered, particles carrying charges of the same polarity as the polarity of the charged filaments of the filter will be repelled to some degree from engagement with the filter filaments and removal of such particles from the stream is hindered or prevented. This is an undesirable condition. Also, in a mass of charged filaments of the same polarity, there is some difficulty in maintaining the filaments in a coherent condition due to the repelling action. The stability of such a high net charge of a given polarity, especially when the charge is not tightly bound in the filaments, is not entirely satisfactory since contact with, or proximity with, neutral or grounded structures tends to dissipate the charge or displace it. As for the filter devices having filaments or sheets each having positive charged areas and negative charged areas to give a zero net charge for the filaments or sheets, these too, appear to possess certain disadvantages relating to the intensity of charges, desired distribution of charges, and effectiveness of fields which can be established for purposes of collecting particles, and relating to manufacturing problems.

It is an object of this invention to provide a novel filter device with significantly increased filtering efficiency and which avoids the disadvantages and overcomes the deficiencies of prior art filter devices.

It is an object of this invention to provide such a filter device, which by reason of its improved efficiency and ability to reduce its penetration by suspended particles in a gas stream, makes possible a significant reduction in filter mass size, especially thickness, which in turn reduces the power required to pass gas therethrough.

It is another object of the invention to provide such an improved filter device with improved stability of charge and longer useful life either when in operation or under inoperative storage conditions.

It is yet another object of this invention to provide such a filter device combination which is not only effective and reliable in operation but also simple and economical to produce, operate, and maintain.

The objects of the invention are achieved by a filter device combination which generally comprises a gas-pervious mass of filamentary elements which comprises a first group of filamentary elements at least the surface portions of which are formed of a given composition, the elements of said first group each having a high net negative electrostatic charge density, said mass further comprising a second group of filamentary elements, at least the surface portions of which are formed of a composition triboelectrically different from said given composition, said elements of said second group each having a high net positive electrostatic charge density, said elements of said groups being thoroughly intimately mixed and interengaged at a number of points throughout said mass, said compositions each having very high electrical surface and volume resistivities sufficient to prevent significant dissipation of the charges on the filamentary elements, said filamentary elements having paired net charge which is significantly greater than the net charge of said filamentary elements, said filamentary elements having sufficient resistance to bending to maintain open spaces between said points and said elements open against the forces acting between said filamentary elements caused by electrostatic charges, said filamentary elements so arranged in said mass with respect to the magnitude of the charges on said elements that substantially all of the open spaces in said mass are subjected to the electrical field effects of said charged elements, said combination preferably further comprising means in operative association with said mass of filamentary elements for preventing gas ions in a gas stream being filtered from reaching said mass of filamentary elements and reducing the electrostatic charges thereof.

Certain terms used in the following description and disclosure are defined as follows:

"Net charge" of a filamentary element or a mass of filamentary elements having both negative electrostatic charge and positive electrostatic charge is the difference between the amount of its charge of one sign and the amount of its charge of the other, or opposite, sign and has the sign of the larger amount of charge.

"Paired net charge" of a mass of filamentary elements having electrostatic charge according to the present invention is the amount of the negative net charges of individual filamentary elements having a corresponding equal amount of the positive net charges of other individual filamentary elements. The magnitude of paired net charge is defined as twice the lesser of (1) the sum of the negative net charges of the filamentary elements individually bearing a negative net charge and (2) the sum of the positive net charges of the filamentary elements individually bearing a positive net charge. To illustrate this, in a mass of filamentary elements having paired net charge equal in amount to the net charge of the mass of filamentary elements as a whole, the sum of the net charges of the filamentary elements individually bearing a net charge of the predominate sign is three times that of the filamentary elements individually bearing a net charge of the subordinate sign.

"Paired net charge density" in a mass of filamentary elements is the quotient of the amount of paired net charge in the mass divided by the total surface area of the filamentary elements in the mass.

"Net charge density" of a mass of filamentary elements is the quotient of the amount of net charge of the mass of filamentary elements as a whole divided by the total surface area of the filamentary elements in the mass.

"Filamentary element" means filaments, fibers, threads, yarns, strands, and the like.

Additional objects and advantages of the invention will appear from a consideration of the following specification and claims taken in conjunction with the accompanying drawings in which:

The embodiments of this invention, as shown in the drawings, will first be discussed in detail, followed by a more general discussion of the principles of the invention and its functioning, and this followed by a discussion of the types of filamentary elements which are believed to be suitable for use in the filter devices of the invention.

*Detailed description of filter apparatus embodiments shown in the drawings*

Although the present invention is of considerable significance to the general field of gas filtering or particle removal from gaseous streams, the invention is believed to have special commercial significance and technical advantages in the somewhat specialized, though large, field of air filtering for domestic, industrial, and military purposes. Therefore, an air filter embodying principles of the present invention and designed for high efficiency service in an air duct handling 1500 cu. ft./min. of air for ventilation of living space is a preferred embodiment of the invention.

Figure 4:
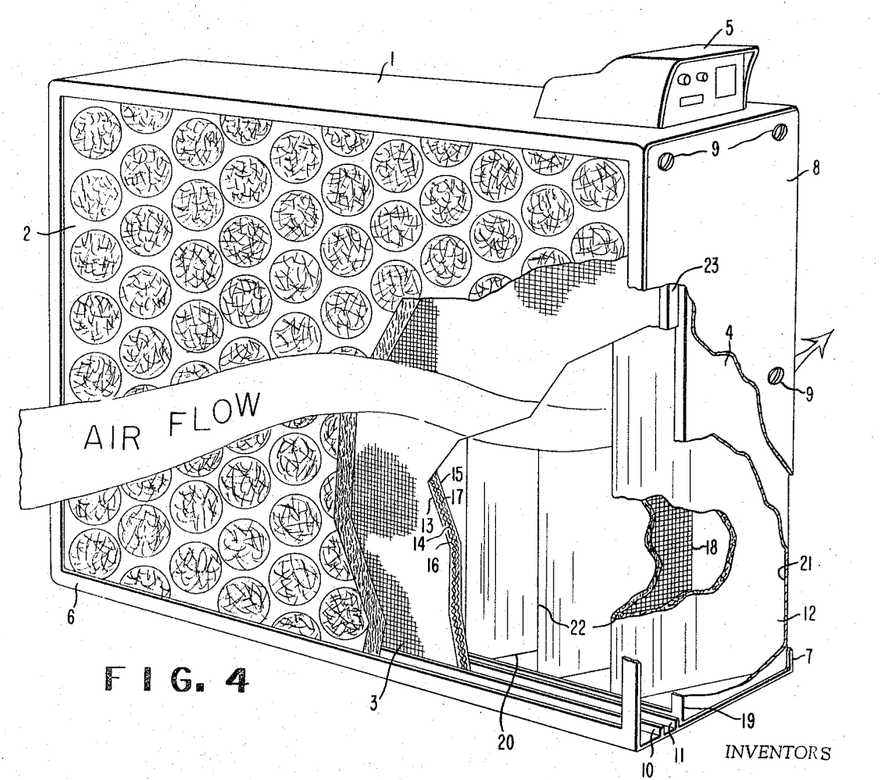
FIGURE 4 is an isometric view of a preferred gas filter device similar to the device of FIGURE 1 and embodying principles of the present invention, with certain parts broken away and shown in section to illustrate the constructions more clearly.
Figure 5:
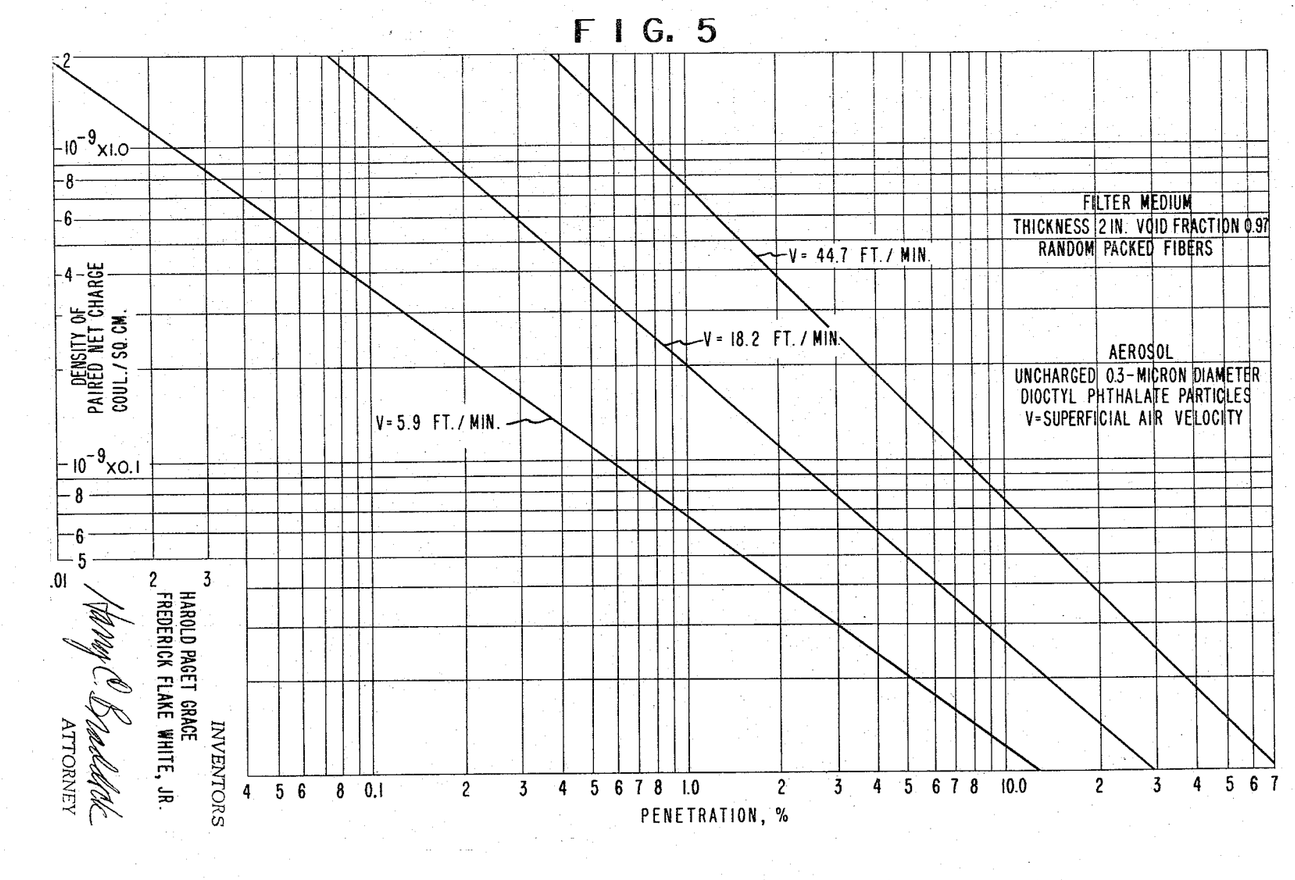
FIGURE 5 is a graphical representation of the variation in particle penetration versus density of paired net charge in filters embodying principles of the present invention.
Figure 6:
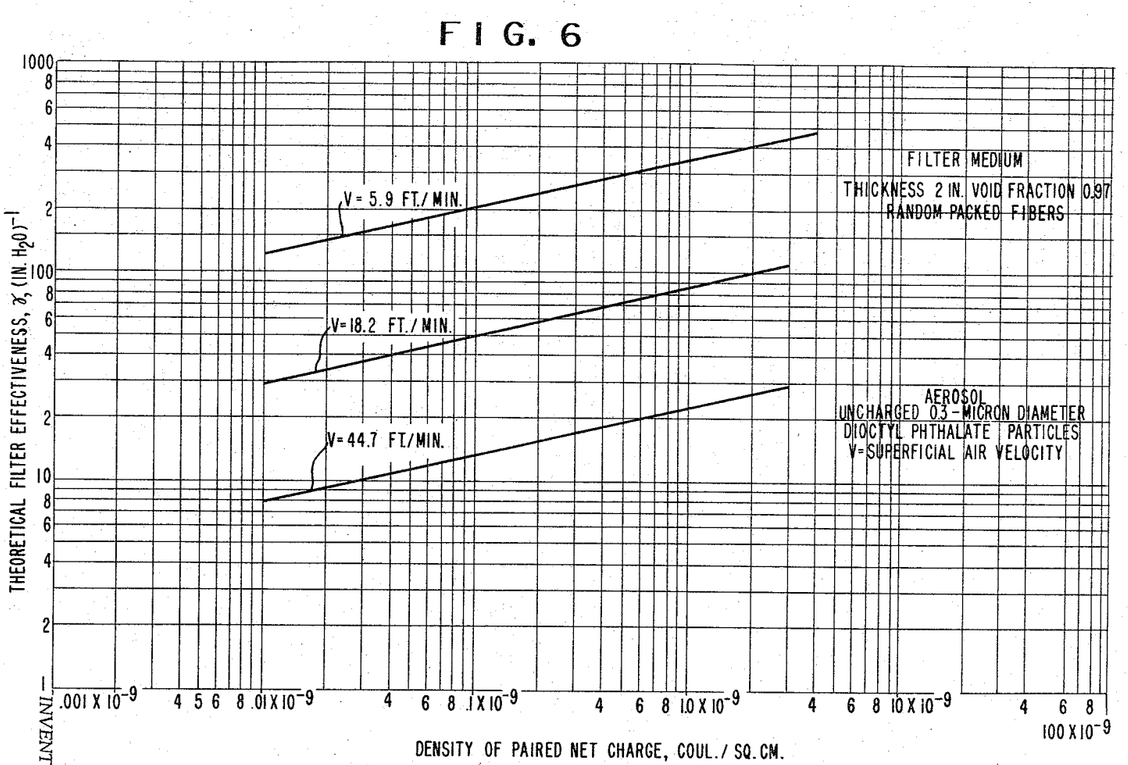
FIGURE 6 is a graphical representation of the theoretical filter effectiveness of filters of the present invention versus the density of paired net charge on the filter fibers.

The complete preferred air filter, shown in FIGURE 4, consists of a casing 1, an air prefilter 2, an ion trap 3, a filter cartridge 4 having a folded filter medium comprising an intimate mixture of electrostatically charged fibers according to the present invention, and a power supply 5, all held in a suitable operating relationship to each other. This unit is adapted to be inserted in a section of the air duct (not shown) equipped with guide flanges which mate tightly with the flange 6 at the air-entrance side of casing 1 and the flange 7 at the air-exit side of casing 1 to provide a substantially air-tight seal, thereby joining the air duct and casing 1 to form a continuous conduit for the ventilating air. Air forced to flow in the air duct by a blower or other suitable air-circulating device external to the air filter is, consequently, forced through the air filters.

Casing 1 has a close-fitting removable plate 8 fastened at one side of casing 1 by screws 9. Tongues 10 and 11 are integral with casing 1 and extend completely around its inner surface, including the inner surface of plate 8. Flange 6 and tongue 10 form with the intermediate casing, a channel in which prefilter 2 is slideably and snugly mounted. Ion trap 3 is similarly mounted in the channel between tongues 10 and 11, and filter cartridge 4 is similarly mounted in the channel between tongue 11 and exit flange 7 of casing 1. When plate 8 is removed, one end of each of prefilter 2, ion trap 3, and filter cartridge 4 is exposed; any or all of these three replaceable members can be slid out of casing 1. The corresponding replacement member or members can be slid into casing 1, and a close-fitting seal between the inner side of the casing 1 and the periphery of each of prefilter 2, ion trap 3, and filter-medium cartridge 4 is completed by replacing plate 8 and securing it with screws 9. Casing 1 can be molded of plastic or made of sheet metal.

Prefilter 2 is an conventional general purpose interception filter. Its function is to collect large dust particles, lint, chips, pieces of paper, and other debris circulating in the air duct.

Ion trap 3, in the preferred embodiment, comprises three galvanized 8-mesh wire screens 13, 14, and 15 made of 20-mil galvanized iron wire which are separated from each other 0.040 to 0.060 in. by 8-mesh electrically insulating plastic screens 16 and 17 sandwiched alternately between the three metal wire screens. These five screens are flat and held in contact at their periphery by a molded frame 23 of electrically insulating plastic, such as nylon. The center galvanized screen 14 is electrically insulated from galvanized screens 13 and 15 and all other parts of the filter unit excepting an electrical contact, molded in the frame 23, for electrically charging the middle galvanized screen 14 to 300 v., D.C., by power supplied from power supply 5. The outer galvanized screens preferably are electrically grounded by contacts molded in frame 23, which contacts are connected to the grounded side of the electrical power supply. This minimizes the danger of accidental electrical shock to persons inspecting or otherwise working on the air filter. The superficial air velocity at the ion trap is 400 ft./min., about four times the superficial air velocity at the filter medium. In the preferred embodiment of the invention, the ion trap is essential to obtaining long effective filter operating life with the enhanced filtration performance resulting from the novel charge distribution and high density of paired net charge on the fibers of the filter medium of the present invention.

Filter cartridge 4 comprises a filter medium preferably made of ½ in. thick carded batt of 20-micron diameter, 4½ in. long fibers of polyoxymethylene resin and 20-micron diameter, 4½ in. long fibers of polypropylene in proportion providing substantially equal areas of each fiber composition.

Fibers of equal diameter in the diameter range 15 to 30 microns can ordinarily be used effectively. Although finer fibers advantageously provide a high ratio of surface to volume which is favorable to good filtration performance, they usually attract higher costs. Stiff fibers, even coarser than 30 microns in diameter, can be admixed with fine fibers to form a carded batt that will not be collapsed, for example, by drag of air flowing through the filter medium, thereby maintaining the filter medium at a desired void fraction while in operation. Alternatively, all of the finer fibers or filamentary elements can be provided with rigidity, or resistance to bending, which is sufficient to maintain the mass of filamentary elements against collapse due to air drag or field forces related to the charged filamentary elements.

Suitable fibers have a total electrical volume resistivity and surface resistivity—expressed as equivalent surface resistivity—of at least about $10^{18}$ ohms on the average in air at 73° F. and 33% relative humidity. Fibers made with no textile finish whatsoever are employed, since the textile finishes normally applied to commercial textile fibers, for lubrication and/or anti-static effect, lowers the electrical resistivity of the fibers to such an extent that the enhanced filtration performance of filter media made from them deteriorates at an excessive rate in storage and use.

Electrostatic charging of the fibers to provide the novel charge distribution of the present invention and to develop a required density of paired net charge on the fibers is accomplished by a carding operation. Multifilament yarns of each composition are cut into staple lengths of about 2 to about 5 in., preferably about 4½ in., and are fed to a carding device. This yarn staple is opened up and converted to a batt of intimately mixed and properly charged fibers by five passes over a carding machine. A carding machine suitable for the purpose is a conventional card having steel fillet wire on the cylinder, doffer, and lickering roll together with steel saw-toothed clothing on the work roll and stripper. No device or attachment normally used to remove static charge from the carded product should be used when carding fibers for the filters of the present invention. It is believed that the fillet wire, or a coating thereon should be, under carding conditions, in an intermediate triboelectric relationship with respect to the fiber compositions in order to create the desired electrostatic charge conditions in the carded fibers. Carding can ordinarily be done in air at card-room condition, but it is advantageous to card the fibers in air below rather than above 50% relative humidity. The carded batt is built to required thickness and a void fraction in the range 0.95–0.98, preferably 0.97. For batt consisting of equal volumes of polyoxymethylene resin in fiber form and polypropylene in fiber form, a density of 1.85 lb./cu. ft. corresponds to 0.97 void fraction. The batt is then combined with a backing of 8-mesh plastic screen 18 by means of a suitable hot-melt wax adhesive, such as is based on commercially available vinyl resins of the type sold under the tradename "Elvax," applied to the batt side of the backing screen and cooled after the batt and the backing screen have been brought into mutual contact. Alternatively, the batt and a thermoplastic backing screen can be laminated by thermally self-edging the materials back-to-back in strip form. In the same operation, the strip can be thermally scored in the cross direction on approximately 8-in. centers to provide rigidized leading edges 22 of the folds of the filter medium when assembled in filter cartridge 4. The backed batt 12 is cut to dimensions to provide an area of 15.5 sq. ft. containing 1.2 lbs. of mixed fibers and is folded in the style of ribbon candy.

The folded strip of backed batt is set in an open frame 19 of cardboard to which it is cemented at all lines of contact to provide a substantially air-tight seal. Durable cements of hydrocarbon rubber in a volatile solvent are satisfactory for this purpose. These lines of contact include the wavy line of contact 20 between the lower end of the folded strip of backed batt and the bottom member of the cardboard frame, the corresponding wavy line of contact of the upper end of folded strip with the top member of the cardboard frame, and the two straight lines of contact 21 (only one shown) between the ends of the folded strip and the end members of the cardboard frame.

The resulting filter cartridge 4 is slidably mounted in casing 1 with the carded batt facing upstream and the plastic screen backing facing downstream. In use, the upstream and the downstream faces of the filter cartridge are open to permit free access of the ventilating air to the folded filter medium. In storage, the dry filter cartridge is totally enclosed in a removable sealed moisture-proof bag, in order to minimize deterioration of the filter as a result of circulation of moist or impure air through the filter medium for long periods of time.

Power supply 5 is a conventional rectifier capable of supplying 300 v. direct current to the ion trap when fed with locally available power, such as power at 110 v. and 60 cycles/sec. Where such electric power is not conveniently or economically available, power supply 5 may be a simple 300 v. dry cell, the current drain being less than one microampere, with one terminal connected to the middle galvanized screen 14 of ion trap 3 and the other terminal connected to ground.

The preferred embodiment of the invention provides a very compact efficient air filter. This compactness results from the enhanced filtration performance of the fibrous filter medium having the novel charge distribution of the invention, the folded filter medium, and the ion trap capable of effective operation at higher superficial air velocity (400 ft./min.) than the filter medium (100 ft./min.). The total volume of the preferred air filter is only one quarter that of a conventional high efficiency interception filter of equal air-flow rating. The superficial air velocity at the face of the filter medium is five times that of the conventional filter, reducing the area of the filter medium to one-fifth that of the conventional filter, with no increase in the total air pressure drop through the complete filter unit. The compactness of the preferred air filter permits its installation in tight locations that cannot accommodate the conventional filter, or that can accommodate the conventional filter only by undersirable protrusion into the living space.

Figure 1:
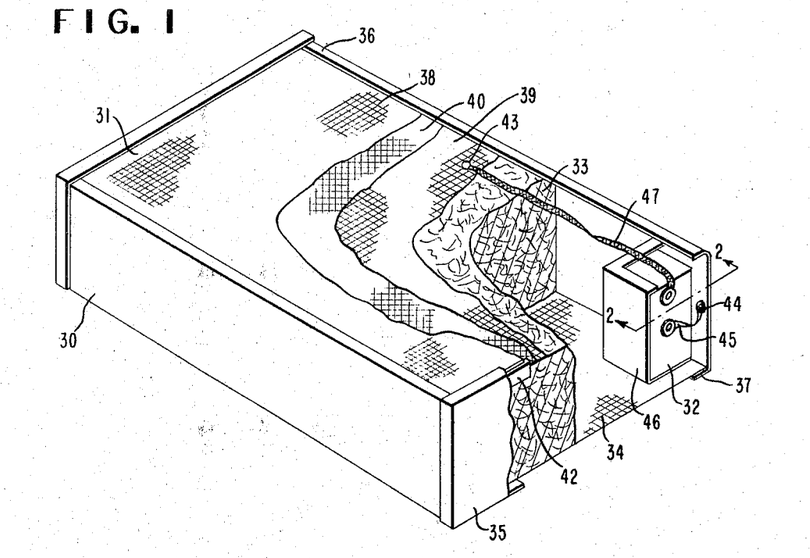
FIGURE 1 is an isometric view of an improved gas filter device embodying principles of the invention, with certain parts broken away and shown in section to better illustrate the features of the filter device.
Figure 2:
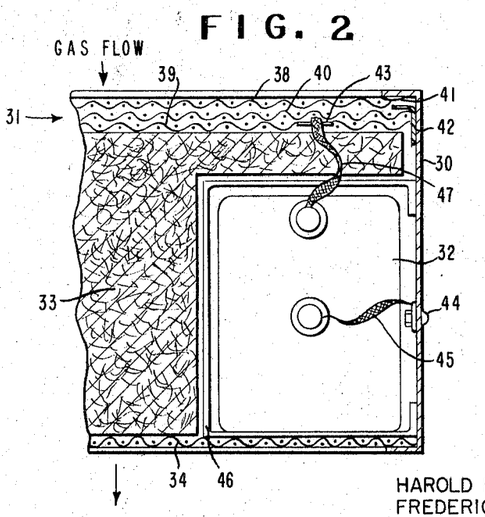
FIGURE 2 is a partial enlarged sectional view of the improved filter device shown in FIGURE 1 taken at line 2—2 of FIGURE 1.
Figure 3:
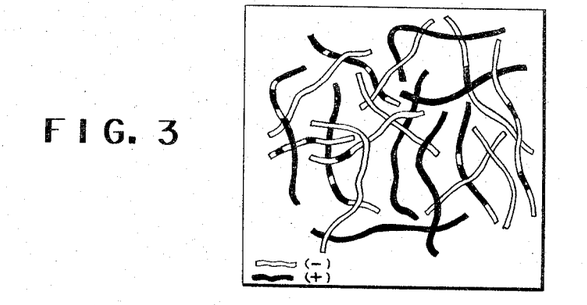
FIGURE 3 is an enlarged, schematic, general showing of illustrative random positions and relationships of the filamentary elements in the gas-pervious filter mass of the preferred embodiment of the present invention, with the positive (+) charged portions of the filamentary elements indicated by the black areas, and the negative (—) charged portions of the filamentary elements indicated by the white areas.

Another embodiment of the invention involves a filter unit as shown in FIGURES 1 and 2, several of which can be assembled side by side in a filter room to present a large area of filter medium to the inlet ventilation air. A conventional general purpose interception filter (not shown) is normally mounted on the air-inlet side of each filter unit. Each unit is a self-contained filter, FIGURE 1. Each unit comprises a casing 30, an ion trap generally indicated by 31, a 300 v. battery 32 positioned in battery-support 46 and electrically connected across the ion trap, a packed bed 33 of carded, intimately mixed, randomly arranged fibers constituting a filter medium having the novel charge distribution of the present invention, and an air-outlet screen 34.

Casing 30 is made of galvanized sheet iron or other conventional sheet metal. Alternatively, the casing may be made of impregnated cardboard, molded plastic, or other electrically insulating material by providing suitable connections of the battery terminals and ion screens, as will be understood by those skilled in the art from the following description. A detachable cover 35 is provided to permit test or replacement of battery 32. The casing is adapted to slide into a sheet-metal holder constructed with the duct work and provided with duct-work flanges mating with flange 36 at the air-inlet side of the casing and with flange 37 at the air-outlet side of the casing, thereby joining the duct work and casing 30 into a substantially air-tight conduit for the air flowing in the duct work.

Ion trap 31 consists of two sheets 38 and 39 of 14 x 18-mesh galvanized-iron fly screening and an electrically insulating sheet 40 of 14 x 18-mesh plastic fly screening sandwiched between these metallic screens. Metallic screen 38 is spot-welded or soldered to metallic casing 30 at one or more points 41. Casing 30 is connected to one terminal of battery 32 by connector 44 and electrical lead 45. Metallic screen 39 is electrically insulated from casing 30 by an angle-section frame 42 of molded electrical insulation, such as polypropylene or vulcanized fiber, resting on insulating screen 40 and extending between the periphery of metallic screen 39 and casing 30. Screen 39 is spot-welded or soldered at 43 to electrical lead 47 going to the other terminal of the battery. Thus metallic screen 38 and casing 30 may be electrically grounded while the potential of the battery is applied across screens 38 and 39, thereby creating an electrical field to collect ions from the air passing through the screens. The battery may be replaced in multiple-leaf installations by a central power source appropriately connected to the several ion traps by conventional means.

Packed bed 33 is composed of an equal volume of polyoxymethylene resin (density 1.41 grams per cc.) and of polypropylene resin (density 0.905 gram per cc.), in the form of 25-micron diameter polyoxymethylene resin fibers and 20-micron diameter polypropylene fibers. The total fiber surface is 45% polyoxymethylene resin and 55% polypropylene. The fibers are made without textile finish in the form of multifilament yarns, which are cut into 4½ in. lengths, mixed in the stated proportions, and passed five times over a conventional card to mix and electrostatically charge the fibers by the contacting and friction of carding. The carded batt is formed into a uniform bed having a density of 1.85 lb./cu. ft. when placed between screens 39 and 34 spaced ½ in. apart in the assembled filter. In the FIGURE 1 embodiment test filter referred to below, small bundles of the carded batt were packed by hand using ivory-tipped tongs to form the fiber bed of the filter. The carded batt used in the filter had, 3 months after carding, a paired net charge density of $2.28 \times 10^{-9}$ coul./sq. cm. of total fiber surface but a net charge density on the batt as a whole of only $1.7 \times 10^{-11}$ coul./sq. cm. of total fiber surface, a ratio of 134 to 1.

Outlet screen 34 is a sheet of 14 x 18-mesh galvanized-iron fly screening which supports the packed fiber bed. Alternatively, outlet screen 34 can be made of 8-mesh plastic screening, since it is not essential that battery potential be maintained between screens 39 and 34.

Packed bed 33 is supported by the ion trap 31 at the upstream side and by outlet screen 34 at the downstream side. In large filter units, the space between ion trap 31 and outlet screen 34 is partitioned off into 10½ x 10½ x ½ in. cells by means of a grid of thin slats of dry wood, polypropylene plastic strips, or similar electrically insulating material. The screens of ion trap 31 and outlet screen 34 are held against the edges of the cell walls by conventional adhesive or mechanical insulating fasteners, thereby maintaining the desired ½ in. spacing between the ion trap and the outlet screen. Each cell is uniformly packed with 27 grams of the fiber mixture. Subdivision of the packed fiber bed in this manner avoids undesirable settlement of the fibers when the filter unit is stored or installed on its narrow edge.

The filtration performance of a test filter representing the FIGURE 1 embodiment of the invention and the performance of a conventional uncharged high efficiency interception filter, both operating on ventilation air passed through a general purpose prefilter, is given below. This demonstrates for a 5-week period of continuous operation the effectiveness of an air filter of the present invention where the superficial air velocity at the face of the filter medium is nearly five times that at the face of the glass-fiber medium of the conventional filter.

| | Figure 1 Embodiment Test Filter | Conventional High Efficiency Interception Filter |
|---|---|---|
| Filter mass composition | (1) | (2) |
| Air flow, cu. ft./min | 1,500 | 1,500 |
| Filter-medium area, sq. ft | 15.4 | 70 |
| Superficial air velocity at filter medium, ft./min | 97.5 | 21.4 |
| Total pressure drop of air filter, in. $H_2O$ | 0.20 | 0.27 |
| Inlet air to filter: | | |
|   Avg. coeff. of haze/1,000 linear ft | 0.295 | 0.25 |
|   Avg. number of particles/liter: | | |
|     0.3–0.5 micron diam | 50,664 | 54,256 |
|     0.5–1.0 micron diam | 8,264 | 5,868 |
|     1–2 microns diam | 363 | 322 |
|     Over 2 microns diam | 11.5 | 12 |
| Filtered Air: | | |
|   Avg. coeff. of haze/1,000 linear ft | 0.082 | 0.10 |
|   Avg. number of particles/liter of air: | | |
|     0.3–0.5 micron diam | 8,903 | 9,524 |
|     0.5–1.0 micron diam | 689 | 693 |
|     1–2 microns diam | 14.8 | 7.3 |
|     Over 2 microns diam | 2.0 | 2.9 |
| N.B.S. Dust-Spot Efficiency | 89.3 | 85.7 |
| Redn. in avg. coeff. of haze/1,000 linear ft., percent | 73.5 | 60 |
| Percent by number of particles removed: | | |
|   0.3–0.5 micron diam | 82.5 | 82.3 |
|   0.5–1.0 micron diam | 91.7 | 88.2 |
|   1–2 microns diam | 95.8 | 94.6 |
|   Over 2 microns diam | 82.6 | 75.8 |

[1] Polyoxymethylene resin fibers (25 microns) and polypropylene fibers (20 microns).
[2] Glass fibers (20 microns diam.)

After the FIGURE 1 embodiment test filter had been operated in the same ventilation service 9 months, there was an increase of pressure drop of only 11½% of the initial value and substantially no change in collection efficiency; the filter was continued in service. During this operation, the relative humidity of the air filtered ranged between about 40% and about 70% and was usually in the range of 50% to 60% relative humidity.

In filtration problems requiring more complete removal of fine suspended particles from air or other gases, and where adequate higher air pressure drop can be provided, the fiber bed of the filter unit can be packed to a higher density or be replaced by a felt of the electrostatically charged fibers. Such felts ordinarily have a void fraction in the range 0.70 to 0.95.

It has been observed that when gases containing mists of water or other electrically conducting liquids are passed through the filter devices of the present invention, the enhanced filtration performance is exhibited only during an initial collection period, before the electrostatic charge on the fibers is dissipated by the electrically conductive liquid deposited on the fibers.

Although the preferred embodiment of our invention has a filter medium of randomly intimately mixed filamentary elements, we believe that effective filters embodying novel features of our invention can have a regular arrangement of the filamentary elements in the filter medium. In such regular arrangement, the individual filamentary elements of one composition and triboelectric characteristic are generally adjacent and parallel to filamentary elements of another composition and triboelectric characteristic. For example, an open netting could be woven using a warp and a filling each consisting of an array wherein single filaments of one composition and triboelectric characteristic alternate with single filaments of another composition and triboelectric characteristic. A sufficient number of layers of a web of this netting could be wound onto the circumference of a large wheel to form a multiple-layered "batt" having a desired thickness and void fraction. The void fraction would be controlled by the tension of wind-up, and the thickness controlled by the number of wraps of the netting on the wheel. The batt, triboelectrically charged by nondestructive working of the same, either while it is still on the wheel or after it has been cut from the wheel would be laid out as a flat sheet. For example, mechanical working of the batt can be accomplished by providing the wheel with a resilient circumferential surface, such as sponge rubber, and, while the netting is on the wheel, working the layers of netting between a multiplicity of rolls and the resilient surface of the wind-up roll. Alternatively, the batt can be charged after it is cut from the wheel, by passage through a multiplicity of sheet-bending rolls. Tribocharging of the batt can be facilitated by small roll diameters and large angle of wrap up to about 180°, or by passage of the batt through a series of nips of loosely interengaged gear-toothed rolls. Various conventional means are available to mechanically work and triboelectrically charge the regular arrangement of filamentary elements.

Filter fabrics can be woven and electrostatically charged as, above using multiple-filament yarns of each composition in place of single filaments of each composition, or using multifilament yarns having filaments of each composition and triboelectric characteristic. Fibers woven of multi-filament yarns will, however, have the lower theoretical filtration effectiveness associated with lower void fraction in a filter medium. Nonwoven regular arrangements of the filamentary elements of the filter medium can be made, for example, by interlayering the warp and the filling of filamentary elements rather than by interweaving them.

*General discussion of invention and operation*

Filters embodying principles of this invention comprise essentially an air-pervious filter mass which comprises an intimate mixture of (a) fibers having a characteristic triboelectric property and individually bearing a net positive electrostatic charge with (b) fibers having a different characteristic triboelectric property and individually bearing a net negative electrostatic charge, the electrical surface and volume resistivity of the fibers in air at 72° F. and 33% relative humidity being at least $10^{18}$ ohms equivalent surface resistivity on the average. The paired-net charge density is desirably at least $0.5 \times 10^{-9}$ coul./sq. cm. of total fiber surface, and preferably at least $1 \times 10^{-9}$ coul./sq. cm. of total fiber surface. We consider these to be high values of paired net charge density, since they are not commonly encountered and are effective in the improved filters of our invention.

Preferably, the filter device combination further comprises an ion trap means cooperating with the above-described electrostatically charged filter mass, although it can easily be recognized that short-life filter devices such as used with cigarettes need not comprise an ion trap.

The triboelectric difference between the surfaces of substantially one half of the filaments with respect to the other half of the filaments is essential to the production of a group of filaments having essentially one sign of charge and another group of filaments essentially having the other sign of charge thereon. When lengths of the yarn (preferably about 4½ in.) are carded by hand implements or on a carding machine to form a batt, the friction at the surface of the fibers electrifies the fibers according to the triboelectric characteristics of the contacting surfaces. Whether there is (1) transfer of charge from fiber to fiber, leaving some fibers net negatively electrostatically charged and others net positively electrostatically charged, or (2) differential transfer of charge between the card and the triboelectrically different fibers, or (3) charge transfer of both types, is not clear. Nevertheless, regardless of the theory, the fact is that the carded batts of fibers assembled as filters in accordance with this invention consist essentially of equal surface areas of fibers individually bearing a strong net positive electrostatic charge and other fibers individually bearing a strong net negative electrostatic charge. It is believed that the difference in triboelectric properties is related to the difference in the nature of the polar groups of the basic chemical units forming the fiber compositions. Any imbalance between the total positive charge and the total negative charge on the fibers in the batt results in a net electrostatic charge on the batt as a whole. Since the total of the individual-fiber net charge of one sign is nearly paired with an equal total of individual-fiber net charge of opposite sign, there is only small net charge on the batt as a whole. Such batts of fibers are compact and show little tendency for individual fibers to stand away from the surface of the batts.

To the extent that the amount of net positive charges on individually net positive fibers is paired with an equal amount of net negative charges on individually net negative fibers, there is no appreciable field external to the bundle to attract neutralizing ions from the surrounding air. Furthermore, the intimate mixture of sites of net positive charge on some fibers with nearby sites of net negative charge on other fibers tends to stabilize the charges by mutual attraction. If a length of fiber bearing net positive charge is viewed as one plate of a capacitor and an adjacent length of fiber bearing net negative charge is viewed as the other plate of the capacitor, it will be realized that the capacity will be greater, the nearer fiber lengths are to each other short of actual contact. Consequently, the potential difference of the adjacent fiber lengths will be reduced, reducing the leakage of charge along the high-resistance fiber paths tending to short-circuit the capacitor. This stabilizes the paired net charges, as compared with the stability of equal charges all of one sign on the same areas. The paired net charges on fibers which have exceptionally high resisivity even in room air at relative humidity up to about 90% persist for long periods in storage. For example, a batt of charged carded fibers essentially composed of polytetrafluoroethylene and having about one-half positively charged fibers and about one-half negatively charged fibers was found to have $1.77 \times 10^{-9}$ coul./sq. cm. average density of paired net charge, an acceptable value, after 5 years' storage. This is an ample shelf-life for a practical filter or a replacement filter system.

Within a bundle of fibers having the novel charge distribution, intense nonuniform electrical fields exist between fibers individually bearing a net charge of one sign and their near neighbors individually bearing a net charge of the opposite sign. However, it is believed necessary that the lengths of adjacent fibers bearing net charge of opposite sign be at least substantially equal to the local fiber-to-fiber distance. Preferably, substantially all of the open spaces in a mass of fibers are subjected to these fields. These non-uniform electric fields induce charge separation on otherwise uncharged particles in a known manner, and draw these particles, as well as charged particles, to the charged fibers. The collected particles are held on the fibers by the electric field and by surface forces such as are effective in adsorption. Penetration of comparable fiber beds of various materials by a standard test aerosol, consisting of uncharged 0.3-micron diameter dioctylphthalate particles, is less the greater the density of paired net charge on the fibers. In theory, the collection effect of the electrical field on uncharged particles is, for a given fiber spacing, proportional to the square of the net charge density on the individually oppositely charged fibers.

Stated in a somewhat different manner, penetration of a fiber bed of our invention by an aerosol is generally more (less desirable) the greater the net charge density on the fiber bed as a whole. This detrimental effect of net charge on the fiber bed is believed to be suprising and contrary to the generally accepted belief that electrostatic charge reduces penetration of the fiber bed by suspended particles. When it is realized that the potential to which a fiber can be charged is limited by charge leakage into the air, it will be readily appreciated that a fully charged fiber bed having a high net charge density necessarily must have a low density of paired net charge on its constituent fibers, and vice versa.

It is believed that the highest density of paired net charge in a fiber bed will result when the surface area of the fibers of one composition substantially equals the surface area of the fibers of the other composition. This permits all of the individual fiber surfaces to be charged to the limit imposed by leakage of charge to the air, without producing a substantial net electrostatic charge on the fiber bed as a whole. For the same reason, the fibers should have substantially equal diameters. Values of these two parameters (ratio of surface areas of the two fiber compositions, and ratio of fiber diameters) are implicit in the maximum value of the paired net charge density a given fiber bed can acquire.

The presence of individual-fiber net positive charge paired by individual-fiber net negative charge on the fibers of a fiber filter bed reduces the penetration of the filter bed by an aerosol but has no effect on the pressure drop through the fiber bed. Consequently, the penetration of an arbitrary thickness of such a filter medium by an aerosol, relative to the pressure drop through the filter medium, is less than if the filter medium were uncharged.

The theoretical filtration effectiveness, $\gamma$, of a fiber filter bed is calculated by the equation:

$$\gamma=\frac{-ln(P_0/100)}{\Delta p}$$

where, $Po$=Percentage of aerosol penetrating the filter, percent
$\Delta p$=Pressure drop through the filter, in $H_2O$.

The theoretical filtration effectiveness of otherwise comparable fiber filter beds is observed to be greater the higher the density of paired net charge on the fibers. For example, the theoretical filter effectiveness of a fiber bed of oppositely charged fibers (see FIG. 6) is reduced from 415 in.$^{-1}$ $H_2O$ at air velocity of 5.9 ft./ min. where the fiber bed has the novel charge distribution of this invention to 72.3 in.$^{-1}$ $H_2O$ at the same air velocity where the same fiber bed has been discharged by exposure to a radioactive source. The corresponding values at air velocity of 44.7 ft./min. are respectively, 25.5 and 3.0 in.$^{-1}$ $H_2O$.

The theoretical filtration effectiveness of a similar bed of equal volumes of polyoxymethylene resin in the form of 25-micron fibers and polypropylene in the form of 20-micron fibers having the charge distribution of the present invention was, in the same service, 456 in.$^{-1}$ $H_2O$ at air velocity of 5.9 ft./min. and 22.9 in.$^{-1}$ $H_2O$ at air velocity of 44.7 ft./min. These fibers were made without textile finish and were charged by carding according to the present invention.

At a given air velocity in the normal operating range, the theoretical filtration effectiveness increases within limits with void fraction of the filter medium. Thus, the theoretical filtration effectiveness for a loosely packed bed of oppositely charged fibers having void fraction of 0.97 is, for filtration of an aerosol of uncharged 0.3 micron dioctylphthalate particles, about 195 in.$^{-1}$ $H_2O$ at an air velocity of 11.4 ft./min. At this same air velocity, a felt of the same fibers having void fraction of 0.73 has a corresponding theoretical filtration effectiveness of only 16.3 in.$^{-1}$ $H_2O$.

It is generally known that air usually contains a small concentration of ions (about 1000 ions/cc.) produced by cosmic rays, radiation from natural and artificial radioactive materials, lightning, corona discharges, and so forth. Net electrostatic charge on a fibrous filter medium, or filter mass of filamentary elements, selectively attracts ions from the air and thereby is continually neutralized. Since the paired net electrostatic charges within the fibrous filter medium of the present invention produce little electrical external field, too few air ions are drawn to the filter medium by electrostatic attraction to effectively neutralize the paired net charges. However, when air is forced through the filter medium, both positive air ions and negative air ions are readily collected (99.99+% collected) by the strong internal nonuniform electric fields. This steadily depletes the paired net charge within the filter medium, thereby reducing the collection efficiency and collection capacity of the filter. Continuous deterioration in filtration performance was shown to limit useful life of the filter to about one month in ventilation service.

To solve this problem where appreciable length of service life is desired, an ion trap to remove ions from the air just before the air enters the fiber mass was devised. Since air ions move in an electrical field at specific velocities of about 1 cm./(sec.)(v./cm.), whereas charged dust particles move at less than 1/1000 of this velocity, it was possible to provide an ion trap that selectively collects air ions rather than dust. A simple version of the ion trap consists of two open-mesh metallic screens, spaced apart by a screen of insulating material, which are charged to a potential (300 v. dry cell) insufficient to produce corona discharge. When such an ion trap was mounted near the entrance to thin, extra-low-density filter medium (to accentuate the effect of air ions) so that all the air to be filtered passed through the ion trap immediately before passing through the filter medium, the life for a doubling of particle penetration increased from 24 hr. to in excess of 10,000 hr.

The net electrostatic charge on a mass of fibers can be measured by the Faraday pail technique. Where the measurement is made on samples of the mass, the samples are cut from the mass by sharp scissors or other cutting instrument in a manner that minimizes deformation, working, and drawing of the samples. Care is taken in cutting and handling the samples to avoid frictional contact of the samples with other solids and liquids, since this contacting may develop a spurious patch charge on the fibers at the surface of a sample. Likewise, the samples are handled with ivory-tipped tongs or the like, since contact with moist fingers would neutralize charge on the samples where the fibers are made temporarily more electrically conductive. It is preferred that the packing density of the samples be maintained substantially the same as in the material samples.

Both the paired net charge and the net charge of a mass of fibers can be derived from charge measurements made with a charge-measuring instrument such as the single-fiber coulometer patented by Moore, U.S.P. 2,980,-855. This type of instrument measures the net charge on a predetermined length, or segment, of a single fiber. We have employed a Moore single-fiber coulometer that measures net charge on only a 3 cm. length of the sample. From such single measurements on each of at least 30 fibers, and preferably on each of 100 fibers, the percentage of the fibers individually bearing net positive charge, the percentage of fibers individually bearing net negative charge, the paired net charge, and the net charge of the mass of fibers are calculated. Hence, the problem of measurement of the individual-fiber net charge is approached statistically, the 3 cm. sample length being taken as representative of the entire fiber. It is important when measuring the net charge on individual fibers to observe the precautions mentioned above regarding measurement of the net charge of a mass of fibers by a Faraday pail. The measurement of individual fiber net charge should be made immediately after the fiber is cut from the mass, since the net charge attracts air ions and is progressively neutralized thereby.

Qualitative determination of the individual fiber net charge is made by a lumographic powder technique. These powders are a mixture of finely divided resin particles of two kinds in equal amounts. One kind of particle is colored red and charged negatively; the other kind is colored green and charged positively. An air suspension of the mixed particles is directed onto a bundle of fibers. The particles adhere selectively to the fiber surface according to the sign and intensity of local electrostatic charge on such surface, the red particles adhering more to the positive (or less negative) charged fiber surface and the green particles adhering more to the negative (or less positive) charged fiber surface. The collection of some particles of each color by the differently charged fibers is believed to result from the presence of induced charges as well as characteristic charge on the particles of lumographic powder. The performance of the particles can be verified by observing whether they selectively adhere to or are repelled by electrostatically charged copper wire.

*Discussion of filamentary element or fiber compositions*

It is believed that many pairs of compositions have sufficient difference in triboelectric characteristics to serve as elements in filters embodying the present invention. It is preferred to use fibers composed entirely of one composition mixed with fibers composed entirely of a triboelectrically different composition, rather than mixtures including fibers having a coating of one composition or the other, although coated filamentary elements or fibers fall within the spirit and scope of the invention. A further criterion for selection of the compositions is that the compositions of the fibers, or filamentary elements, have high electrical resistivity under the conditions of storage and use to minimize charge neutralization by electrical conduction along the fibers by way of the points of fiber-to-fiber contact. For making the practical air filters of the present invention, it is necessary that the electrical resistivity of the fibers of each composition exceed a definite value as discussed elsewhere in this specification.

Three pairs of fiber compositions representing illustrative non-limiting examples of groups of filamentary elements useful in filter devices of this invention and which are especially useful in preparing fiber beds having sufficiently enhanced and durable aerosol filtration performance are set forth as follows:

(a) Polyoxymethylene resin filamentary elements (+) and polypropylene filamentary elements (−)

(b) Polyoxymethylene resin filamentary elements (+) and bleached polytetrafluoroethylene filamentary elements (−)

(c) Polyoxymethylene resin filamentary elements (+) and polyvinyl chloride filamentary elements (−).

Measured values of the total electrical volume resistivity and surface resistivity, expressed as equivalent surface resistivity, for fibers (20 microns diameter) of the various compositions in air at 72° F. and 33% relative humidity are given below in ohms.

Bleached polytetrafluoroethylene
fibers ______________________________ more than $10^{18}$
Polyoxymethylene resin fibers ________ more than $10^{18}$
Polypropylene fibers ________________ more than $10^{18}$
Polyvinyl chloride fibers ____________________ $6 \times 10^{19}$ All of the above fibers were made without any textile finish whatsoever. Commercial fibers, excepting polytetrafluoroethylene are normally made with textile finish to lubricate the fibers and/or to minimize electrostatic charge on the fibers. Polytetrafluoroethylene fibers having an antistatic finish are commercially available. The polyvinyl chloride fiber was made without plasticizer in order to avoid reducing the electrical resistivity of the fiber by this addition.

The polyoxymethylene fibers were made from commercially available polyoxymethylene resin containing about 0.5 w/o of a thermal stabilizer and about 0.2 w/o of an antioxidant and having a melt flow rate of about five (Grade 1 in A.S.T.M. test D–2133–62T). The resin was spun into multifilament yarn of 3-denier filaments, which yarns were drawn 4× at 140° C. at 40 to 120 ft./min. No textile finish was used.

The polypropylene fibers were made from commercially available polypropylene resin containing about 0.07 w/o of a thermal stabilizer, about 0.26 w/o of an antioxidant, and about 0.49 w/o of an ultra-violet stabilizer. The resin had a melt flow rate of about eleven and a melt index of about 5. Eight-filament yarns of 3-denier filaments were spun from the resin at 240° C. with a draw ratio of 10.6. No textile finish was used.

(a) *Polyoxymethylene fibers and polypropylene fibers.*—A filter mass or bed made of fibers of commercial polyoxymethylene resin using textile finish and commercially available polypropylene fibers exhibited definitely enhanced aerosol filtration performance immediately after the fibers had been mixed by carding. However, three to four days later, a significant and unacceptable drop in filtration performance had occurred. On the other hand, a similar fiber bed made of polyoxymethylene fibers and polypropylene fibers, both being without textile finish, exhibited no significant change in the excellent filtration performance after several months' storage subsequent to the carding step. The improvement is believed due to the greatly increased resistivity of the fibers produced without the usual textile finishes.

A mass or filter bed of fibers made without textile finish from a single triboelectric composition nevertheless undergoes rapid deterioration in filtration performance, even though the fibers have equivalent surface resistivity above $10^{18}$ ohms and the filter is not kept in operation. This can be seen from the extent of penetration of a 0.3-micron diameter aerosol of dioctylphthalate through a 2.5-in. thick filter bed packed to 0.97 void fraction. For such a bed of 20-micron diam. polypropylene fibers made without textile finish, the penetration at 5.9 ft./min. air velocity increased from 0.58% immediately after the fiber had been carded to 1.20% four days later. At 44.7 ft./min. air velocity, the penetration increased from 6.9% to 9.8%. Immediately after having been carded, the polypropylene fiber bed as a whole had a negative net charge density of $0.14 \times 10^{-9}$ coul./sq.cm. of fiber surface and a paired net charge density of $0.056 \times 10^{-9}$ coul./sq.cm., the paired net charge density being only 40% of the net charge density and probably resulting from inhomogeneity of the fiber. Eighty percent of the fibers had individually a negative net charge and 20% a positive net charge.

Where the filter bed consisted of 25-micron diameter polyoxymethylene fibers made without textile finish, the penetration at 5.9 ft./min. air velocity increased from 2.80% immediately after the fiber had been carded to 24.5% four days later. At 44.7 ft./min. air velocity, the penetration increased from 28% to 67%. Immediately after having been carded, the polyoxymethylene fiber bed as a whole had a positive net charge density of $0.30 \times 10^{-9}$ coul./sq.cm. and a paired net charge density of $0.048 \times 10^{-9}$ coul./sq.cm., the paired net charge density being only 16% of the net charge density. Eighty percent of the fibers had individually a positive net charge and 20% a negative net charge.

A surprisingly large and lasting enhancement of filtration performance resulted when the filter bed was packed with equal polymer volumes of the above polypropylene fibers and the above polyoxymethylene fibers previously mixed by carding. The penetration at 5.9 ft./min. was only 0.01% one month after the fibers had been carded. At 44.7 ft./min., the corresponding penetration was only 0.65%. At that time, the filter bed as a whole had a negligible net charge density of only $0.017 \times 10^{-9}$ coul./sq.cm. and a surprisingly large paired net charge density of $2.28 \times 10^{-9}$ coul./sq.cm., substantially half of the fibers having individually a positive net charge and half a negative net charge. The paired net charge density of this mixed fiber bed one month after it had been carded was over 40 times the paired net charge density of the polypropylene fiber bed immediately after it had been carded, and over 47 times that of the polyoxymethylene fiber bed immediately after it had been carded. Evidently, a high density of paired net charge and superior filtration performance, together with retention thereof, result from the combination of the high resistivity of the fibers and the carded mixture of fibers of triboelectrically different compositions.

(b) *Polyoxymethylene fiber and bleached polytetrafluoroethylene fiber combination.*—Fibers or filamentary elements formed essentially of polytetrafluoroethylene in accordance with U.S. Patent No. 2,772,444 can be bleached by heating to between 200° C. and 320° C. for a sufficient time in air or oxygen. Little or no bleaching occurs if the temperature is kept below 200° C. If the temperature is raised above about 320° C., the fibers fuse together. The preferred temperature range is 240°–265° C. The time for which the fiber is held at the selected temperature is not critical, but heating in air for less than 2 days gives incomplete bleaching and as much as 14 days may be required. The length of time required to accomplish this depends on the temperature, packed density of the fiber, and circulation of the air or oxygen. It is preferred to carry out the bleaching in a circulating oven.

Alternatively, the yarns of polytetrafluoroethylene filaments can be bleached by exposure to a mixture of concentrated sulfuric and nitric acids. The rate of bleaching is dependent on the temperature. At 315° C. it takes only a few minutes, while at 120° C. it takes several hours. A convenient technique has been to place the sample in boiling sulfuric acid while intermittently adding small portions of nitric acid through a dropping funnel reaching to the bottom of the vessel. It is necessary, of course, to thoroughly wash the fibers in pure water, in order to remove ionizable and electrically conductive impurities, until the dry fiber has the required high resistivity.

A packed filter bed of freshly carded bleached polytetrafluoroethylene fibers had, as a whole, a high negative net charge density of $0.9 \times 10^{-9}$ coul./sq.cm., but a paired net charge density of only $0.016 \times 10^{-9}$ coul./sq.cm., 95% of the fibers having an individual net negative charge and only 5% having an individual net positive charge. In spite of the high density of net negative charge on the filter bed, the penetration by 0.3-micron dioctylphthalate test aerosol was, at air velocity of 5.9 ft./min., about ¼ that of a comparable bed of polytetrafluoroethylene filaments discharged by exposure to ionizing radiation in air. Hence, the carded bleached polytetrafluoroethylene fibers provide only slightly enhanced filtration performance over an electrostatically discharged but otherwise comparable filter bed.

Similarly, a bundle of freshly carded polyoxymethylene fibers had, as a whole, a positive net charge density of $0.3 \times 10^{-9}$ coul./sq.cm., but a paired net charge density of only $0.048 \times 10^{-9}$ coul./sq.cm., 80% of the fibers having an individual net positive charge and 20% having an individual net negative charge immediately after carding. The filtration performance of this material was about equal to that of the freshly carded, bleached polytetrafluoroethylene fibers.

A distinctly different, improved, and unexpected result was obtained from a freshly carded, equal-polymer-volume mix of 25-micron diameter polyoxymethylene fibers and 20-micron diameter bleached polytetrafluoroethylene fibers. While the net charge density of a bundle of these fibers was $0.32 \times 10^{-9}$ coul./sq. cm., the paired net charge density was a greater value, $1.42 \times 10^{-9}$ coul./sq. cm. The filtration performance of this mixed fiber bed was far superior to that of either the carded fiber bed of bleached polytetrafluoroethylene fibers or the carded fiber bed of polyoxymethylene fibers. The penetration of the mixed fiber bed by 0.3-micron dioctylphthalate aerosol was, at air velocity of 5.9 ft./min., only 0.39% that of the fiber bed of bleached polytetrafluoroethylene fibers and only 0.54% that of the fiber bed of polyoxymethylene fibers. In this mixed fiber bed or mass, the number of fibers carrying a net positive electrostatic charge and the number of fibers carrying a net negative electrostatic charge were substantially equal.

(c) *Polyoxymethylene fiber and polyvinyl chloride fiber combination.*—The polyvinyl chloride fibers used are made from opaque, porous, pressure-coalesceable material used in production of film. This material in sheet form becomes transparent where subjected to sufficient pressure, as from the blow of a typewriter bar having a raised character on its striking face. The polyvinyl chloride fibers and processes of making them are disclosed in copending U.S. patent application Serial No. 231,856, filed October 19, 1962, now abandoned.

The polyvinyl chloride fibers used are formed from a solution of the polymer, which is hydrophobic, in a solvent having great attraction for water and capable of forming hydrates. A hot solution of polymer in dimethyl acetamide is preferred, but dimethyl formamide can be used as the solvent. When the solution is extruded into a suitable aqueous bath, the polymer is instantaneously precipitated in the form of a porous polymer structure having nearly the diameter of the stream of polymer solution issuing from the spinneret. The voids within the polymer structure are filled with the aqueous phase containing solvent. The washed and dried product is a highly porous filament of the polymer. The filaments are weak relative to solid filaments of the same polymer and diameter. The porosity of the filaments can be reduced and their strength relative to solid fiber of equal diameter correspondingly increased by hot drawing.

The 20-micron diameter polyvinyl chloride fibers employed for the purposes of the present invention were estimated to be 80% voids. They were made, with neither textile finish nor plasticizer, of polyvinyl chloride having a density of 1.40 g./cc. The fibers were carded by hand, and they readily developed a high electrostatic charge. Individual fibers initially stood out from the mass of carded fibers.

A bundle of these freshly carded polyvinyl fibers had, as a whole, a high negative net charge density of $1.09 \times 10^{-9}$ coul./sq. cm. but a paired net charge density of only $0.33 \times 10^{-9}$ coul./sq. cm., 80% of the fibers having a net negative charge and 20% of the fibers having a net positive charge. In spite of the high density of net negative charge on the carded fiber bed as a whole, the penetration by 0.3-micron dioctylphthalate aerosol was, at air velocity of 5.9 ft./min., reduced to only 6.5% that of a comparable bed of discharged polytetrafluoroethylene fibers.

The small enhancement of filtration performance of a carded bed of the polyoxymethylene fibers has been discussed in the preceding section relating to the polytetrafluoroethylene and polymethylene fibers.

An unexpected enhancement of filtration performance was obtained from a freshly carded, equal-fiber-volume mix of the polyoxymethylene fibers and the porous polyvinyl chloride fibers. The penetration of this bed by a 0.3-micron dioctylphthalate test aerosol was, at air velocity of 5.9 ft./min., only 0.08% that of the freshly carded bed of polyoxymethylene fibers alone and only 0.2% that of the freshly carded bed of porous polyvinyl chloride fibers alone.

It is believed that both the general and the specific structures of the improved filter devices of this invention, as well as the operation of these devices, can be clearly understood by those skilled in the art from the foregoing descriptions.

Applicants have provided a novel filter device arrangement which functions in an improved manner, yet is simple and economical, in acordance with the objects of the invention.

Although a detailed description has been given of various embodiments of the invention in accordance with the patent statute, many changes and modifications within the spirit of the invention will be obvious to those skilled in the art. Such changes and modifications are considered to fall within the scope of the following claims.

What is claimed is:

1. An improved gas filter arrangement for removing small particles suspended in a gaseous stream, said arrangement comprising in combination a gas-pervious loosely packed mass of filamentary elements, said mass comprising a first group of filamentary elements, at least the surface portions of which are formed of a given composition, said filamentary elements of said first group each having a high net negative electrostatic charge density, said mass further comprising a second group of filamentary elements, at least the surface portions of which are formed of a composition triboelectrically different from said given composition, said filamentary elements of said second group each having a predominant high net positive electrostatic charge density, said filamentary elements of said groups being thoroughly intimately mixed, intertangled and interengaged at a number of points throughout said mass, said compositions each having very high electrical surface and volume resistivities sufficient to prevent significant dissipation of the charges on the filamentary elements, said filamentary elements of said mass having a paired net charge density which is significantly greater than the net charge density of said elements, said filamentary elements of said mass having sufficient resistance to bending to maintain spaces between said points of interengagement and between said elements open against the forces acting between said elements and caused by the electrostatic charges, said filamentary elements so arranged within said mass with respect to the magnitude of the charges of said elements that substantially all of the open spaces in the mass are subjected to electrical field effects existing between spaced charged portions of adjacent filamentary elements, said arrangement further comprising means in operative association and cooperation with said mass of filamentary elements for preventing gas ions in a gaseous stream being filtered from reaching said elements and reducing the charges thereof.

2. An improved gas filter arrangement for removing small particles in the size range above about 0.2 micron maximum dimension suspended in a gaseous stream, said arrangement comprising in combination a gas-pervious loosely packed mass of filamentary elements, said mass comprising a first group of filamentary elements, at least the surface portions of which are formed of a given composition, said filamentary elements of said first group each having a high net negative electrostatic charge density, said mass further comprising a second group of filamentary elements, at least the surface portions of which are formed of a composition triboelectrically different from said given composition, said filamentary elements of said second group each having a predominant high net positive electrostatic charge density, said filamentary elements of said groups being thoroughly randomly intimately mixed, intertangled and interengaged at a number of points throughout said mass, said compositions each having very high electrical surface and volume resistivities sufficient to prevent significant dissipation of the charges on the filamentary elements, said filamentary elements of said mass having a paired net charge density which is significantly greater than the net charge density of said elements, said filamentary elements of said mass having sufficient resistance to bending to maintain spaces between said points of interengagement and between said elements open against the forces acting between said elements and caused by the electrostatic charges, said filamentary elements so arranged within said mass with respect to the magnitude of the charges of said elements that substantially all of the open spaces in the mass are subjected to electrical field effects existing between spaced charged portions of adjacent filamentary elements, said arrangement further comprising means in operative association and cooperation with said mass of filamentary elements for preventing gas ions in a gaseous stream being filtered from reaching said elements and reducing the charges thereof.

3. The improved gas filter arrangement of claim 1 in which said very high electrical surface and volume resistivity in air at about 72° F. and about 33% relative humidity is about at least $10^{18}$ ohms equivalent surface resistivity on the average.

4. The improved gas filter arrangement of claim 3 in which the paired net charge has a density of at least about $0.5 \times 10^{-9}$ coulombs per square centimeter of total filamentary element surface.

5. The improved gas filter arrangement of claim 4 in which the filamentary elements of said first group and said filamentary elements of said second group have substantially the same amount of surface area.

6. The improved gas filter arrangement of claim 5 in which said filamentary elements of said groups are formed of synthetic organic polymeric material free of finish and other additives affecting resistivity, said elements of said groups having substantially the same transverse dimensions with the minimum transverse dimension being in the range from about 15 to about 50 microns.

7. The improved gas filter arrangement of claim 6 in which said filamentary elements are staple fibers of from about one inch to about six inches in length.

8. The improved gas filter arrangement of claim 7 in which the degree of predominance of the predominant charge on any of said filaments is greater than 3 to 1 on the basis of charged surface area of a given filament.

9. The improved arrangement of claim 8 in which said mass of filamentary elements is packed to a density which gives a void fraction of about 0.97.

10. An improved gas filter arrangement for removing small particles suspended in a gaseous stream, said arrangement comprising in combination a gas-pervious loosely packed mass of filamentary elements, said mass comprising a first group of filamentary elements, at least the surface portions of which are formed of a given synthetic organic polymeric composition, said filamentary elements of said first group each having a high net negative electrostatic charge density, said mass further comprising a second group of filamentary elements, at least the surface portions of which are formed of a synthetic organic polymeric composition chemically significantly different from said given composition and differing significantly as to the nature of the polar groups in the polymer units of the composition, said filamentary elements of said second group each having a high net positive electrostatic charge density, said filamentary elements of said groups being thoroughly intimately mixed, intertangled and interengaged at a number of points throughout said mass, said compositions each having a very high electrical surface and volume resistivity sufficient to prevent significant dissipation of the charges on the filamentary elements, said filamentary elements of said mass having paired net charge density which is significantly greater than the net charge density of said elements, said filamentary elements of said mass having sufficient resistance to bending to maintain spaces between said points of interengagement and between said elements open against the forces acting between said elements and caused by the electrostatic charges, said filamentary elements so arranged within said mass with respect to the magnitude of the charges of said elements that substantially all of the open spaces in the mass are subjected to electrical field effects existing between spaced charged portions of adjacent filamentary elements.

11. An improved gas filter arrangement for removing particles in the size range above about 0.2 micron maximum dimension suspended in a gaseous stream, said arrangement comprising in combination a gas-pervious loosely packed mass of filamentary elements, said mass comprising a first group of filamentary elements, at least the surface portions of which are formed of a given synthetic organic polymeric composition, said filamentary elements of said first group each having a high net negative electrostatic charge density, said mass further comprising a second group of filamentary elements, at least the surface portions of which are formed of a synthetic organic polymeric composition chemically significantly different from said given composition and differing significantly as to the nature of the polar groups in the polymer units of the composition, said filamentary elements of said second group each having a high net positive electrostatic charge density, said filamentary elements of said groups being thoroughly randomly intimately mixed, intertangled and interengaged at a number of points throughout said mass, said compositions each having a very high electrical surface and volume resistivity sufficient to prevent significant dissipation of the charges on the filamentary elements, said filamentary elements of said mass having a paired net charge density which is significantly greater than the net charge density of said elements, said filamentary elements of said mass having sufficient resistance to bending to maintain spaces between said points of interengagement and between said elements open against the forces acting between said elements and caused by the electrostatic charges, said filamentary elements so arranged within said mass with respect to the magnitude of the charges of said elements that substantially all of the open spaces in the mass are subjected to electrical field effects existing between spaced charged portions of adjacent filamentary elements.

12. The improved gas filter arrangement of claim 10 in which said very high electrical surface and volume resistance in air at about 72° F. and about 33% relative humidity is about at least $10^{18}$ ohms equivalent surface resistivity on the average.

13. The improved gas filter arrangement of claim 12 in which the paired net charge has a density of at least about $0.5 \times 10^{-9}$ coulombs per square centimeter of total filamentary element surface.

14. The improved gas filter arrangement of claim 13 in which the filamentary elements of said first group of said filamentary elements and of said second group have substantially the same amount of surface area.

15. The improved gas filter arrangement of claim 14 in which said filamentary elements of said group are formed of material free of finish and other additives effecting resistivity, said elements of said groups having substantially the same transverse dimension being in the range from about 15 to about 50 microns.

16. The improved gas filter arrangement of claim 15 in which said filamentary elements are staple fibers of from about one inch to about six inches in length.

17. The improved gas filter arrangement of claim 16 in which the degree of predominance of the predominant charge on any of said filaments is greater than 3 to 1 on the basis of charged surface area of a given filament.

18. The improved arrangement of claim 17 in which said mass of filamentary elements is packed to a density which gives a void fraction of about 0.97.

19. The improved arrangement of claim 11 in which said different composition essentially comprises a polyoxymethylene resin and said given composition essentially comprises a polypropylene resin.

20. The improved arrangement of claim 11 in which said different composition essentially comprises a polyoxymethylene resin and said given composition essentially comprises a polytetrafluoroethylene resin.

21. The improved arrangement of claim 11 in which said different composition essentially comprises a polyoxymethylene resin and said given composition essentially comprises a polyvinyl chloride resin.

22. The improved arrangement of claim 1 in which said different composition essentially comprises a polyoxymethylene resin and said given composition essentially comprises a polypropylene resin.

23. The improved arrangement of claim 1 in which said different composition essentially comprises a polyoxymethylene resin and said given composition essentially comprises a polytetrafluoroethylene resin.

24. The improved arrangement of claim 1 in which said different composition essentially comprises a polyoxymethylene resin and said given composition essentially comprises a polyvinyl chloride resin.

References Cited by the Examiner

UNITED STATES PATENTS

| | | | |
|---|---|---|---|
| 2,573,964 | 11/1951 | Green et al. | 55—103 |
| 2,597,927 | 5/1952 | Endres | 55—103 |
| 2,612,966 | 10/1952 | Nicol | 55—103 |
| 2,724,457 | 11/1955 | Besser | 55—103 |
| 2,740,184 | 4/1956 | Thomas | 55—2 X |
| 2,804,937 | 9/1957 | Poole | 55—103 |
| 2,814,355 | 11/1957 | Powers | 55—132 |
| 2,821,261 | 1/1958 | Vixler et al. | 55—103 |
| 2,908,347 | 10/1959 | Roos | 55—131 X |
| 2,933,154 | 4/1960 | Lauterbach | 55—97 |
| 2,990,912 | 7/1961 | Cole | 55—130 |
| 3,018,845 | 1/1962 | Powers | 55—124 |

W. B. KNIGHT, *Primary Examiner.*

R. F. BURNETT, *Assistant Examiner.*